United States Patent
Chen et al.

(10) Patent No.: US 10,661,666 B2
(45) Date of Patent: May 26, 2020

(54) TRACTION DISTRIBUTION METHOD AND SYSTEM OF POWER-DISTRIBUTED TRAIN

(71) Applicants: CRRC ZHUZHOU INSTITUTE CO., LTD., Zhuzhou, Hunan (CN); ZHUZHOU CRRC TIMES ELECTRIC CO., LTD., Zhuzhou, Hunan (CN)

(72) Inventors: Wenguang Chen, Hunan (CN); Jianghua Feng, Hunan (CN); Xiong Liu, Hunan (CN); Chaolu Chen, Hunan (CN); Hua Xiao, Hunan (CN); Junfeng Xu, Hunan (CN); Huishui Peng, Hunan (CN); Peijin Xie, Hunan (CN); Yuanji Lu, Hunan (CN); Wenye Yuan, Hunan (CN); Long Wang, Hunan (CN)

(73) Assignees: CRRC ZHUZHOU INSTITUTE CO., LTD., Zhuzhou, Hunan (CN); ZHUZHOU CRRC TIMES ELECTRIC CO., LTD., Zhuzhou (CN)

( * ) Notice: Subject to any disclaimer, the term of this patent is extended or adjusted under 35 U.S.C. 154(b) by 0 days.

(21) Appl. No.: 15/580,690

(22) PCT Filed: Jun. 28, 2016

(86) PCT No.: PCT/CN2016/087441
§ 371 (c)(1),
(2) Date: Dec. 8, 2017

(87) PCT Pub. No.: WO2017/005111
PCT Pub. Date: Jan. 12, 2017

(65) Prior Publication Data
US 2018/0201157 A1   Jul. 19, 2018

(30) Foreign Application Priority Data
Jul. 9, 2015   (CN) .......................... 2015 1 0400532

(51) Int. Cl.
*B60L 15/38*   (2006.01)
*B61C 17/00*   (2006.01)
(Continued)

(52) U.S. Cl.
CPC ........... *B60L 15/38* (2013.01); *B60L 15/2036* (2013.01); *B61C 11/005* (2013.01); *B61C 17/00* (2013.01);
(Continued)

(58) Field of Classification Search
CPC combination set(s) only.
See application file for complete search history.

(56) References Cited

U.S. PATENT DOCUMENTS

| 4,042,810 A | * | 8/1977 | Mosher | ..................... G09B 9/04 105/61 |
| 4,087,725 A | * | 5/1978 | Burn | ....................... C10B 39/14 105/136 |

(Continued)

FOREIGN PATENT DOCUMENTS

| CN | 1093989 A | 10/1994 |
| CN | 201731930 U | 2/2011 |

(Continued)

OTHER PUBLICATIONS

International Search Report for PCT/CN2016/087441, dated Sep. 8, 2016, ISA/CN
(Continued)

*Primary Examiner* — Adam D Tissot
*Assistant Examiner* — Edward J Pipala
(74) *Attorney, Agent, or Firm* — Yue (Robert) Xu; Apex Attorneys at Law, LLP

(57) ABSTRACT

A method for tractive force distribution for a power-distributed train is provided, which includes: determining a current motor car of a target train; acquiring parameter information
(Continued)

of the current motor car; calculating, based on the parameter information, axle load transfer at four axles of the current motor car; calculating, based on the axle load transfer at the four axles of the current motor car, current axle loads on the four axles of the current motor car; and performing, based on the current axle loads on the four axles, distribution of tractive forces of the four axles of the current motor car using an electrical control compensation technology.

5 Claims, 6 Drawing Sheets

(51) Int. Cl.
    *B60L 15/20*     (2006.01)
    *B61C 11/00*     (2006.01)

(52) U.S. Cl.
    CPC ....... *B60L 2200/26* (2013.01); *B60L 2240/12* (2013.01); *B60L 2240/26* (2013.01); *B60L 2240/423* (2013.01); *Y02T 10/7275* (2013.01)

(56) References Cited

U.S. PATENT DOCUMENTS

| | | | |
|---|---|---|---|
| 4,094,367 A * | 6/1978 | Jones | G01G 19/047 |
| | | | 177/1 |
| 5,285,866 A | 2/1994 | Ackroyd | |
| 5,289,093 A | 2/1994 | Jobard | |
| 6,988,451 B2 * | 1/2006 | Marcotte | B60F 1/043 |
| | | | 105/215.1 |
| 9,580,090 B2 * | 2/2017 | Kumar | B61L 3/006 |
| 2004/0089192 A1 * | 5/2004 | Jacob | B61D 15/00 |
| | | | 105/215.2 |
| 2007/0089637 A1 * | 4/2007 | Sproat | B60F 1/046 |
| | | | 105/72.2 |
| 2010/0235022 A1 * | 9/2010 | Siddappa | B61C 17/12 |
| | | | 701/20 |
| 2014/0188375 A1 | 7/2014 | Kumar et al. | |

FOREIGN PATENT DOCUMENTS

| | | |
|---|---|---|
| CN | 102866023 A | 1/2013 |
| CN | 103010225 A | 4/2013 |
| CN | 103318194 A | 9/2013 |
| CN | 103507829 A | 1/2014 |
| CN | 104960526 A | 10/2015 |
| JP | 2005295659 A | 10/2005 |
| JP | 2008182827 A | 8/2008 |
| JP | 5254748 B2 | 8/2013 |
| JP | 2014198533 A | 10/2014 |

OTHER PUBLICATIONS

First Examination Report dated Nov. 27, 2019 for Indian patent application No. 201717043925, 5 pages.

* cited by examiner

TRACTION DISTRIBUTION METHOD AND SYSTEM OF POWER-DISTRIBUTED TRAIN

This application is the national phase of International Application No. PCT/CN2016/087441, titled "TRACTION DISTRIBUTION METHOD AND SYSTEM OF POWER-DISTRIBUTED TRAIN", filed on Jun. 28, 2016, which claims the priority to Chinese Patent Application No. 201510400532.9, titled "TRACTION DISTRIBUTION METHOD AND SYSTEM OF POWER-DISTRIBUTED TRAIN", filed on Jul. 9, 2015 with the State Intellectual Property Office of People's Republic of China, which are incorporated herein by reference in their entireties.

FIELD

The present disclosure relates to the technical field of power-distributed trains, and in particular to a method and a system for tractive force distribution for a power-distributed train.

BACKGROUND

With the development of technology, there is a growing concern over a method for tractive force distribution for a power-distributed train.

In a conventional power-distributed train, axle loads on some of driving axles decrease due to axle load transfer, resulting in reduction in adhesion utilization of the train, such that a tractive force of the power-distributed train is not utilized to a maximum extent.

Therefore, a technical issue currently to be solved by those skilled in the art is how to optimize adhesion utilization, thereby utilizing the tractive force of the power-distributed train to a maximum extent.

SUMMARY

According to the present disclosure, a technical issue to be solved is to provide a method and a system for tractive force distribution for a power-distributed train, for solving the technical issue in the conventional technology that, axle loads on some of driving axles of the power-distributed train decrease due to axle load transfer, resulting in reduction in adhesion utilization of the train, such that a tractive force of the power-distributed train is not utilized to a maximum extent.

Solutions are as follows.

A method for tractive force distribution for a power-distributed train is provided, which includes:
  determining a current motor car of a target train;
  acquiring parameter information of the current motor car;
  calculating, based on the parameter information, axle load transfer at four axles of the current motor car;
  calculating, based on the axle load transfer at the four axles of the current motor car, current axle loads on the four axles of the current motor car; and
  performing, based on the current axle loads on the four axles, distribution of tractive forces of the four axles of the current motor car using an electrical control compensation technology.

In the above method, preferably, the acquiring parameter information of the current motor car may include:
  acquiring a mass, a current acceleration, a current resistance, a current tractive force, and a structural dimension of the current motor car.

In the above method, preferably, in a case where the target train is in a traction state, the calculating, based on the parameter information, the axle load transfer at the four axles of the current motor car may include:
  calculating a force applied by a front coupler of the current motor car, a force applied by a rear coupler of the current motor car, and gravity of the current motor car based on the mass, the current acceleration, the current resistance and the current tractive force of the current motor car; and
  calculating the axle load transfer at the four axles of the current motor car based on the force applied by the front coupler of the current motor car, the force applied by the rear coupler of the current motor car, the gravity of the current motor car, and the structural dimension of the current motor car.

In the above method, preferably, the performing, based on the current axle loads on the four axles, distribution of tractive forces of the four axles of the current motor car using the electrical control compensation technology may include:
  performing distribution of the tractive forces of the four axles of the current motor car based on a proportion of the current axle loads on the four axles.

A system for tractive force distribution for a power-distributed train is provided, which includes:
  a determination unit configured to determine a current motor car of a target train;
  an acquisition unit configured to acquire parameter information of the current motor car;
  a first calculation unit configured to calculate, based on the parameter information, axle load transfer at four axles of the current motor car;
  a second calculation unit configured to calculate, based on the axle load transfer at the four axles of the current motor car, current axle loads on the four axles of the current motor car; and
  a distribution unit configured to perform, based on the current axle loads on the four axles, distribution of tractive forces of the four axles of the current motor car using an electrical control compensation technology.

In the above system, preferably, the parameter information acquired by the acquisition unit may include a mass, a current acceleration, a current resistance, a current tractive force, and a structural dimension of the current motor car.

In the above system, preferably, the first calculation unit may further include:
  a third calculation unit configured to calculate a force applied by a front coupler of the current motor car, a force applied by a rear coupler of the current motor car, and gravity of the current motor car based on the mass, the current acceleration, the current resistance and the current tractive force of the current motor car in a case where the target train is in a traction state; and
  a fourth calculation unit configured to calculate the axle load transfer at the four axles of the current motor car based on the force applied by the front coupler of the current motor car, the force applied by the rear coupler of the current motor car, the gravity of the current motor car, and the structural dimension of the current motor car in a case where the target train is in a traction state In the method for tractive force distribution for a power-distributed train according to the present disclosure, first, the current motor car of the target train is determined, and the parameter information of the current motor car is acquired; then, the axle load transfer at the four axles of the current motor car is calculated based on the parameter information, and the current axle loads on the four axles of the current motor car are calculated based on the axle load transfer at the four axles of the current motor car; finally, distribution of the tractive forces of the four axles of the current motor car is performed based on the current axle loads of the four axles using the electrical control compensation technology. According to the present disclosure, distribution of the tractive forces of the four axles is performed using the electrical control compensation technology, such that an output torque of a traction motor with a decreased axle load decreases based on a decrease amount of the axle load, and an output torque of a traction motor of the axle with an increased axle load increases based on an increase amount of the axle load. Therefore, the output torque of the traction motor matches with the axle load, thereby optimizing adhesion utilization, such that the total tractive force is utilized to a maximum extent.

BRIEF DESCRIPTION OF THE DRAWINGS

The drawings to be used in the description of the embodiments of the present disclosure are described briefly as follows, so that the technical solutions according to the embodiments of the present disclosure become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

Technical solutions according to embodiments of the present disclosure are described clearly and completely hereinafter in conjunction with drawings used in the embodiments of the present disclosure. Apparently, the described embodiments are only some rather than all of the embodiments of the present disclosure. Any other embodiments obtained by those skilled in the art based on the embodiments of the present disclosure without any creative work fall within the scope of protection of the present disclosure.

Figure 1:
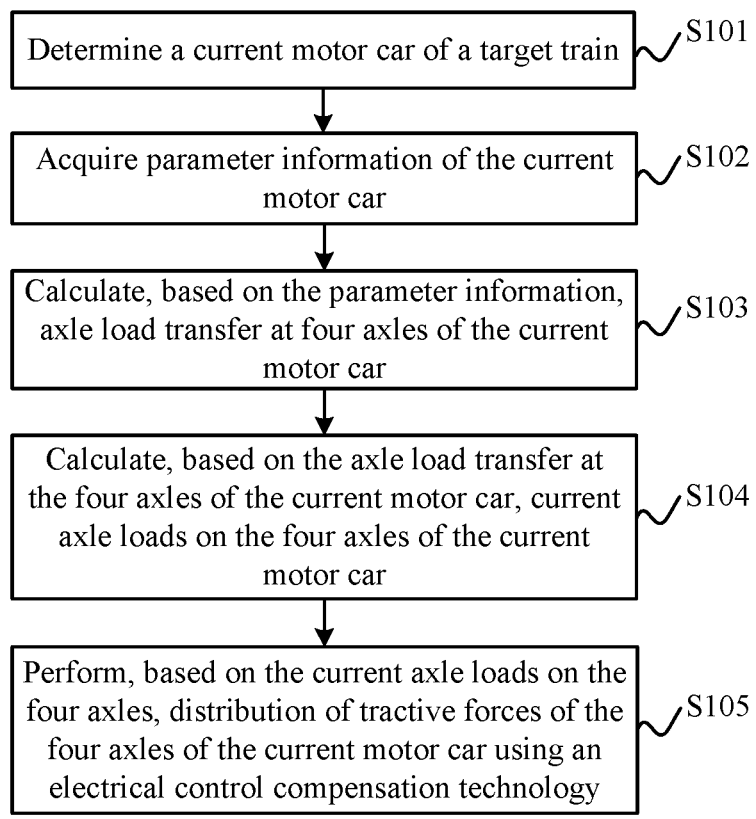
FIG. 1 is a flowchart of a method for tractive force distribution for a power-distributed train according to an embodiment of the present disclosure.

Reference is made to FIG. 1, which is a flowchart of a method for tractive force distribution for a power-distributed train according to an embodiment of the present disclosure. The method may include the following steps S101 to S105.

In step S101, a current motor car of a target train is determined.

A power-distributed train generally includes multiple cars, which includes several motor cars and several trailer cars. Power of the power-distributed train is distributed to the motor cars. Therefore, effective adhesion weight of the power-distributed train is greater than that of a power-concentrated train, which facilitates utilization of the tractive force.

A motor car refers to a rail transit car with a tractive force.

A trailer car refers to a rail transit car without a tractive force, which is to be towed by a car with a tractive force.

A power-distributed train generally includes multiple motor cars. Therefore, when the motor cars are analyzed, a current motor car is to be determined. Then, the current motor car is analyzed.

In step S102, parameter information of the current motor car is acquired.

According to the present disclosure, the acquiring the parameter information of the current motor car includes acquiring a mass, a current acceleration, a current resistance, a current tractive force and a structural dimension of the current motor car.

According to the present disclosure, the velocity of the train may be acquired from a velocity sensor on each of driving axles or on a traction motor, the acceleration of the train may be calculated by performing a differential operation on the velocity of the train by a controller, the mass of a motor car may be acquired by a car weighing system, the tractive force of a motor car may be calculated by a traction control unit, and the resistance of a motor car may be calculated from the velocity of the train and the mass of the motor car using a resistance equation of the train. Therefore, the above variables are all known.

The driving axle refers to an axle for transferring a tractive force.

In step S103, axle load transfer at four axles of the current motor car is calculated based on the parameter information.

According to the present disclosure, the axle load transfer at the four axles of the current motor car is calculated by considering two cases, which include a case where the motor car is in a rest state and a case where the motor car is in a traction state. The axle load transfer at the four axles of the current motor car is calculated based on the condition of the current motor car in the rest state and the condition of the current motor car in the traction state.

In step S104, current axle loads on the four axles of the current motor car are calculated based on the axle load transfer at the four axles of the current motor car.

In step S105, distribution of tractive forces of the four axles of the current motor car is performed based on the current axle loads on the four axles using an electrical control compensation technology.

According to the present disclosure, in the process of optimizing distribution of the tractive forces of the axles of the current motor car based on the current axle loads of the four axles using the electrical control compensation technology, a greater axle load transfer at the current axle indicates a decreased axle load on the axle, in which case a tractive force distributed to the current axle is decreased; on the contrary, a smaller axle load transfer at the current axle indicates an increased axle load on the axle, in which case a tractive force distributed to the current axle is increased, thereby preventing idling of the axles, such that the tractive force is utilized to a maximum extent.

With the method for tractive force distribution for a power-distributed train according to the present disclosure, distribution of the tractive forces of the four axles is performed using the electrical control compensation technology, such that an output torque of a traction motor with a decreased axle load decreases based on a decrease amount of the axle load, and an output torque of a traction motor of the axle with an increased axle load increases based on an increase amount of the axle load. Therefore, the output torque of the traction motor matches with the axle load, thereby optimizing adhesion utilization, such that the total tractive force is utilized to a maximum extent.

In the present disclosure, a vertical force of the car is transferred via a spring between a wheel-pair and a bogie as well as a spring between the bogie and a car body, and a horizontal force is transferred via a bearing box of a driving wheel and a central support.

In the present disclosure, it is assumed that tractive forces at wheel rims of the driving wheels of the car are the same.

In a case where the target train is in the rest state, gravity of the current motor car is calculated based on the mass of the current motor car, and each of the axle loads on the four axles of the current motor car is equivalent to a quarter of the gravity.

Figure 2:
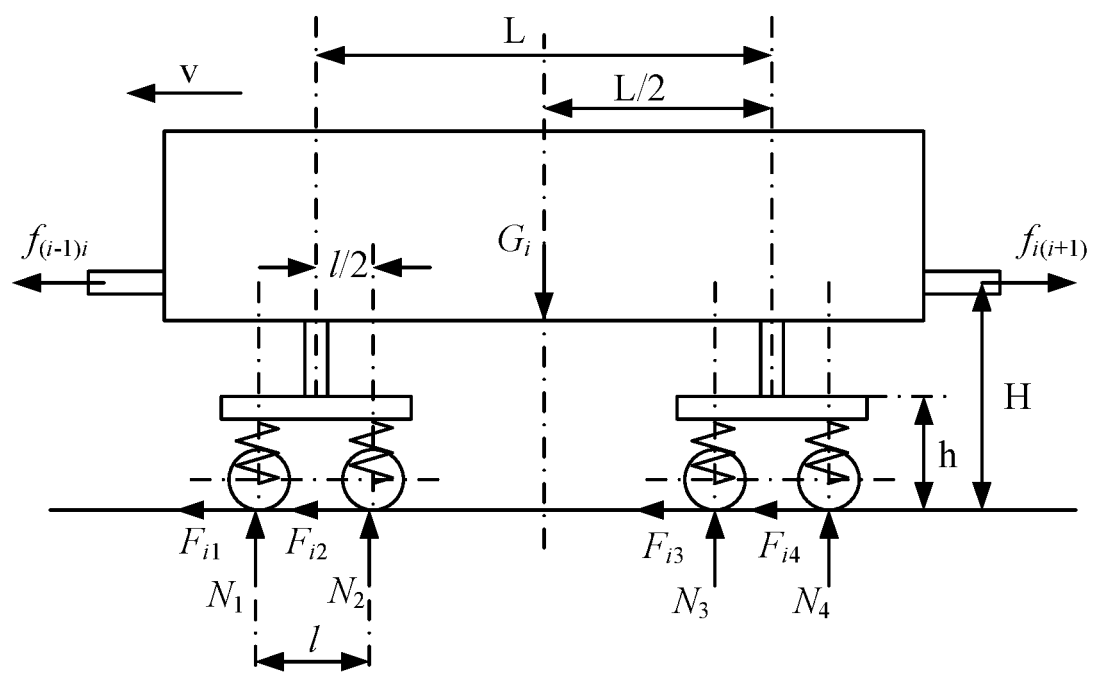
FIG. 2 is a schematic structural diagram illustrating forces applied to a whole current motor car according to the present disclosure.

As shown in FIG. 2, in a case where the motor car is in the rest state, both a force applied by a front coupler of the current motor car and a force applied by a rear coupler of the current motor car are zero. In this case, axle loads $P_i$ on the wheel-pairs are uniformly distributed, each of the axle loads $P_i$ is equal to a reactive force $N_i$ from the steel rail, and is equivalent to ¼ of the gravity $G_i$ of the motor car:

$$N_1 = N_2 = N_3 = N_4 = \frac{G_i}{4}.$$

Figure 3:
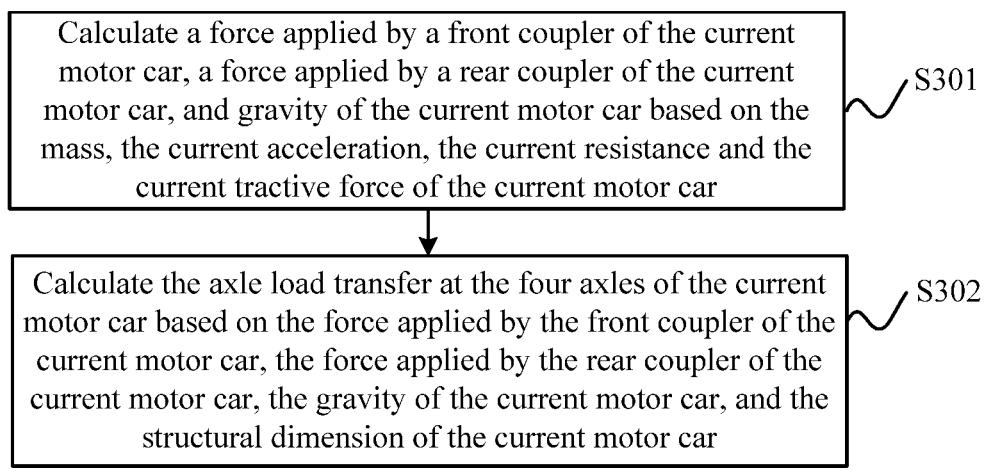
FIG. 3 is a flowchart of a method for tractive force distribution for a power-distributed train according to another embodiment of the present disclosure.

In a case where the target train is in the traction state, as shown in FIG. 3, the calculating the axle load transfer at the four axles of the current motor car based on the parameter information includes the following step S301 and step S302.

In step S301, the force applied by the front coupler of the current motor car, the force applied by the rear coupler of the current motor car, and the gravity of the current motor car are calculated based on the mass, the current acceleration, the current resistance and the current tractive force of the current motor car.

In step S302, the axle load transfer at the four axles of the current motor car is calculated based on the force applied by the front coupler of the current motor car, the force applied by the rear coupler of the current motor car, the gravity of the current motor car, and the structural dimension of the current motor car.

Groups of the power-distributed train may be organized in various forms. Generally, six cars are organized into one group. In the present disclosure, a subway train where six cars are organized into one group is described as an example, and other group organizations can be acquired by analogy. Generally, the subway train where six cars are organized into one group may have the configuration where one group includes 3 motor cars and 3 trailer cars, 4 motor cars and 2 trailer cars, or 6 motor cars and 0 trailer car. The configuration where one group includes 6 motor cars and 0 trailer car is most typical, and the trailer car in other configurations can be considered as a special motor car with no tractive force. Therefore, the following analysis is based on the configuration where one group includes 6 motor cars and 0 trailer car.

Figure 4:
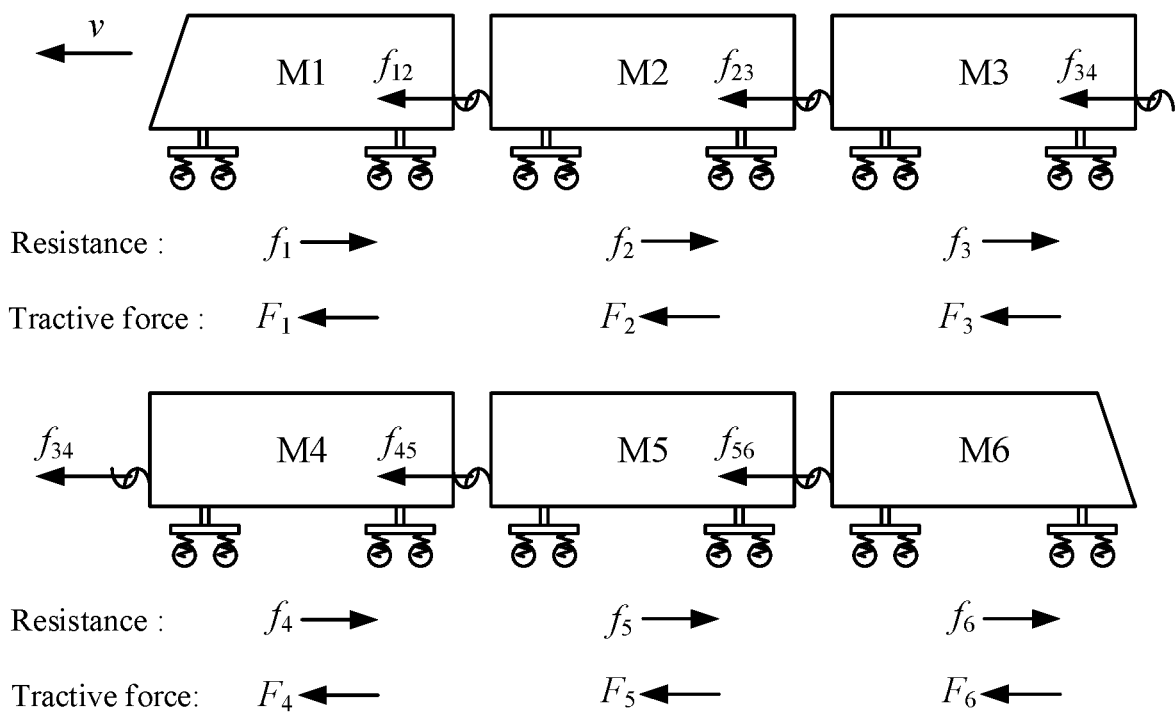
FIG. 4 is a schematic structural diagram illustrating analysis of forces applied to a whole train according to the present disclosure.

FIG. 4 is a schematic diagram illustrating analysis of forces applied to a subway train where one group includes six cars. Meanings of variables in FIG. 4 are as follows.

$M1, M2, \ldots, M6$ are reference numerals representing the motor cars; $f_1, f_2, \ldots, f_6$ represent resistances of the motor cars, respectively; $F_1, F_2, \ldots, F_6$ represent tractive forces of the motor cars, respectively; $f_{12}, f_{23}, \ldots, f_{56}$ represent forces applied by couplers between motor cars, respectively; weights of the motor cars are represented by $m_1, m_2, \ldots, m_6$, respectively; the velocity of the train is represented by v, and the acceleration of the train is represented by a.

Based on the Newton's second law and the analysis of forces applied to the cars, the forces applied by the front couplers and the forces applied by the rear couplers of the motor cars can be acquired and represented by the following equations 1 to 5.

$$f_{12}=F_1-f_1-m_1a \quad (1)$$

$$f_{23}=f_{12}+F_2-f_2-m_2a \quad (2)$$

$$f_{34}=f_{23}+F_3-f_3-m_3a \quad (3)$$

$$f_{45}=f_{34}+F_4-f_4-m_4a \quad (4)$$

$$f_{56}=f_{45}+F_5-f_5-m_5a=F_6-f_6-m_6a \quad (5)$$

The Forces applied by couplers between motor cars can be calculated based on the above equations 1-5, and are defined to be in a forward direction with respect to a following car, as shown in FIG. 4. In fact, since M1, which serves as the head car, is subject to a great air resistance, the force $f_{12}$ applied by the rear coupler of M1 is actually in a backward direction relative to the following car. Therefore, $f_{12}$ is negative.

The force applied by the front coupler of the i-th motor car and the force applied by the rear coupler of the i-th motor car of the power-distributed train with any group organization can be derived based on the above equations 1 to 5, and can be expressed by the following equations 6 and 7.

$$f_{(i-1)i}=(F_1+F_2+\ldots+F_{i-1})-(f_1+f_2+\ldots+f_{i-1})-(m_1+m_2+\ldots+m_{i-1})a \quad (6)$$

$$f_{i(i+1)}=(F_1+F_2+\ldots+F_i)-(f_1+f_2+\ldots+f_i)-(m_1+m_2+\ldots+m_i)a \quad (7)$$

Figure 5:
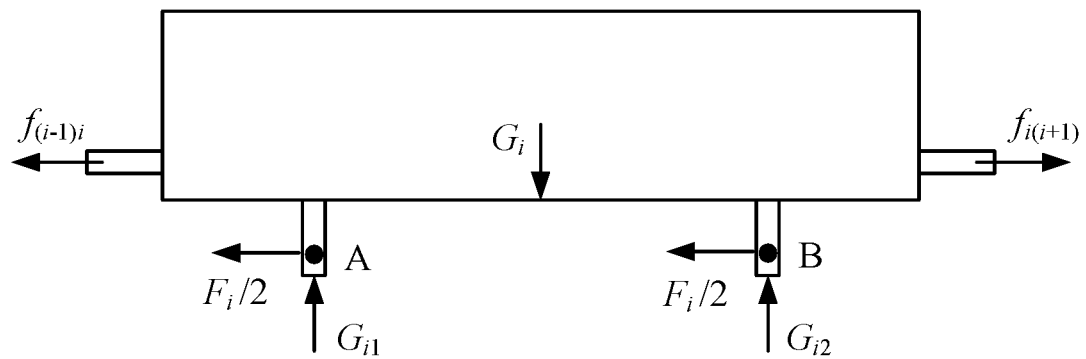
FIG. 5 is a schematic structural diagram illustrating forces applied to the current motor car in a traction state according to the present disclosure.
Figure 6:
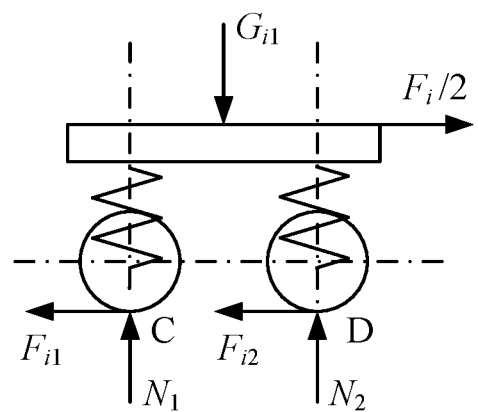
FIG. 6 is a schematic structural diagram illustrating forces applied to axles of the current motor car in a traction state according to the present disclosure.

In the present disclosure, the current axle loads on the four axles of the current motor car are calculated based on the axle load transfer at the four axles of the current motor car. In a case where the train is in the traction state, forces applied to the car body and the bogie are as shown in FIG. 5 and FIG. 6. Taking the car body as an isolated body, the torque at point B is expressed by the following equation 9.

$$f_{i(i+1)}(H-h)-f_{(i-1)i}(H-h)+G_{i1}L-G_i\frac{L}{2}=0 \quad (9)$$

Based on equation 9, the following Equation 10 can be derived.

$$G_{i1}=\frac{G_i}{2}-\frac{(f_{i(i+1)}-f_{(i-1)i})(H-h)}{L} \quad (10)$$

Similarly, the following equation 11 can be derived from an equation of the torque at point A.

$$G_{i2} = \frac{G_i}{2} + \frac{(f_{i(i+1)} - f_{(i-1)i})(H - h)}{L} \quad (11)$$

Equation 10 and equation 11 show that, in a case that $f_{i(i+1)} > f_{i(i-1)i}$, a load on a front bogie is decreased, and a load on a rear bogie is increased under the tractive force and the forces applied by the couplers.

Taking the front bogie as an isolated body, the torque at point D is expressed by the following equations.

$$2F_i h - G_{i1} \frac{l}{2} + N_1 l = 0 \quad (12)$$

$$N_1 = \frac{G_{i1}}{2} - \frac{F_i h}{2l} \quad (13)$$

Similarly, the following equation 14 can be derived from an equation of the torque at point C.

$$N_2 = \frac{G_{i1}}{2} + \frac{F_i h}{2l} \quad (14)$$

Equation 13 and equation 14 show that, in a same bogie, a load on a front wheel-pair is decreased, and a load on a rear wheel-pair is increased.

The following equations 15 and 16 can be acquired by substituting equation 10 into equation 13 and equation 14.

$$N_1 = \frac{G_i}{4} - \frac{(f_{i(i+1)} - f_{(i-1)i})(H - h)}{2L} - \frac{F_i h}{2l} \quad (15)$$

$$N_2 = \frac{G_i}{4} - \frac{(f_{i(i+1)} - f_{(i-1)i})(H - h)}{2L} + \frac{F_i h}{2l} \quad (16)$$

Similarly, the following equation 17 and equation 18 can be acquired.

$$N_3 = \frac{G_i}{4} + \frac{(f_{i(i+1)} - f_{(i-1)i})(H - h)}{2L} - \frac{F_i h}{2l} \quad (17)$$

$$N_4 = \frac{G_i}{4} + \frac{(f_{i(i+1)} - f_{(i-1)i})(H - h)}{2L} + \frac{F_i h}{2l} \quad (18)$$

In the present disclosure, the performing, based on the current axle loads on the four axles, distribution of tractive forces of the four axles of the current motor car using the electrical control compensation technology includes:

performing distribution of the tractive forces of the four axles of the current motor car based on a proportion of the current axle loads on the four axles.

For the above case where the axle load transfer at the four axles of the current motor car is changed when the motor car is in the traction state, the current axle loads on the four axles are changed correspondingly. In this case, distribution of the tractive forces of the axles is performed based on the proportion of the current axle loads on the four axles.

$$F_{i1} : F_{i2} : F_{i3} : F_{i4} = N_1 : N_2 : N_3 : N_4 \quad (19)$$

A final tractive force distribution solution for adhesion optimization can be acquired by substituting equations 15 to 18 into equation 19.

Figure 7:
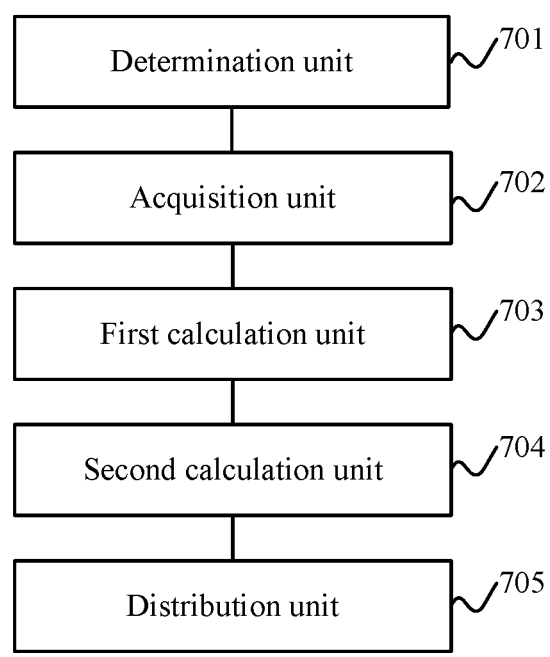
FIG. 7 is a schematic diagram of a system for tractive force distribution for a power-distributed train according to an embodiment of the present disclosure.

Corresponding to the above method for tractive force distribution for a power-distributed train according to an embodiment of the present disclosure, as shown FIG. 7, a system for tractive force distribution for a power-distributed train is further provided according to an embodiment of the present disclosure. According to the embodiment, the system includes a determination unit 701, an acquisition unit 702, a first calculation unit 703, a second calculation unit 704, and a distribution unit 705.

The determination unit 701 is configured to determine a current motor car of a target train.

The acquisition unit 702 is configured to acquire parameter information of the current motor car.

The first calculation unit 703 is configured to calculate axle load transfer at four axles of the current motor car based on the parameter information.

The second calculation unit 704 is configured to calculate current axle loads on the four axles of the current motor car based on the axle load transfer at the four axles of the current motor car.

The distribution unit 705 is configured to perform distribution of tractive forces of the four axles of the current motor car based on the current axle loads on the four axles using an electrical control compensation technology.

According to the present disclosure, the parameter information acquired by the acquisition unit includes a mass, a current acceleration, a current resistance, a current tractive force, and a structural dimension of the current motor car.

The first calculation unit includes a third calculation unit and a fourth calculation unit.

The third calculation unit is configured to calculate a force applied by a front coupler of the current motor, a force applied by a rear coupler of the current motor, and gravity of the current motor car based on the mass, the current acceleration, the current resistance and the current tractive force of the current motor car in a case where the target train is in a traction state.

The fourth calculation unit is configured to calculate the axle load transfer at the four axles of the current motor car based on the force applied by the front coupler of the current motor car, the force applied by the rear coupler of the current motor car, the gravity of the current motor car, and the structural dimension of the current motor car in a case where the target train is in a traction state.

It should be noted that, the embodiments of the present disclosure are described in a progressive manner, and each embodiment places emphasis on the difference from other embodiments. Therefore, one embodiment can refer to other embodiments for the same or similar parts. Since the apparatus embodiment corresponds to the method embodiment, the description of the apparatus embodiment is simple, and reference may be made to the relevant part of the method embodiment.

Finally, it should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device For convenience of description, the above apparatus is divided into various units based on functions for description, and the units are described separately. Of course, in implementation of the present disclosure, the functions of the units can be implemented in a same piece of software and/or hardware, or multiple pieces of software and/or hardware.

As can be seen from description of the above embodiments, those skilled in the art can clearly understand that the present disclosure can be implemented with the help of software and a necessary conventional hardware platform. Based on such understanding, the essence or the part contributing to the conventional technology of the technical solution of the present disclosure can be embodied in a form of a software product. The computer software product may be stored in a storage medium, such as a ROM/RAM, a magnetic disk, or an optical disk, and includes multiple instructions for enabling a computer device (which may be a personal computer, a server, a network device and the like) to perform methods described in the embodiments or some parts of the embodiments of the present disclosure.

In the above, a method and a system for tractive force distribution for a power-distributed train according to the present disclosure are described in detail. Although specific embodiments are described for explaining the principle and implementation of the present disclosure, the description of the embodiments is only for facilitating understanding the idea and core of the present disclosure. For those skilled in the art, modification may be made to the specific embodiment and application according to the spirit of the present disclosure. In summary, the description is not to be interpreted as limitation to the present disclosure.

The invention claimed is:

1. A method for tractive force distribution for a power-distributed train, comprising:
   determining a current motor car of a target train;
   acquiring parameter information of the current motor car, comprising: acquiring a mass, a current acceleration, a current resistance, a current tractive force, and a structural dimension of the current motor car;
   calculating, based on the parameter information, axle load transfer at four axles of the current motor car;
   for each of the four axles of the current motor car, calculating, based on the axle load transfer at the four axles, a current axle load on the axle of the current motor car, wherein increased axle load transfer at the axle indicates a decreased axle load on the axle, and decreased axle load transfer at the axle indicates an increased axle load on the axle; and
   adjusting, based on current axle loads on the four axles, distribution of a tractive force applied to each of the four axles of the current motor car using an electrical control compensation technology, wherein the electrical control compensation technology comprises: for each of the four axles of the current motor car,
   if the axle load on the axle is decreased, decreasing an output torque of a traction motor arranged at the axle based on a decrease amount of the axle load, and
   if the axle load on the axle is increased, increasing an output torque of a traction motor arranged at the axle load based on an increase amount of the axle load.

2. The method according to claim 1, wherein in a case where the target train is in a traction state, the calculating, based on the parameter information, the axle load transfer at the four axles of the current motor car comprises:
   calculating a force applied by a front coupler of the current motor car, a force applied by a rear coupler of the current motor car, and gravity of the current motor car based on the mass, the current acceleration, the current resistance and the current tractive force of the current motor car; and
   calculating the axle load transfer at the four axles of the current motor car based on the force applied by the front coupler of the current motor car, the force applied by the rear coupler of the current motor car, the gravity of the current motor car, and the structural dimension of the current motor car.

3. The method according to claim 1, wherein the adjusting, based on current axle loads on the four axles, distribution of a tractive force applied to each of the four axles of the current motor car using the electrical control compensation technology comprises:
   adjusting distribution of the tractive force applied to each of the four axles of the current motor car based on a proportion of the current axle loads on the four axles.

4. A system for tractive force distribution for a power-distributed train, comprising:
   a determination unit configured to determine a current motor car of a target train;
   an acquisition unit configured to acquire parameter information of the current motor car, wherein the parameter information acquired by the acquisition unit comprises a mass, a current acceleration, a current resistance, a current tractive force, and a structural dimension of the current motor car;
   a first calculation unit configured to calculate, based on the parameter information, axle load transfer at four axles of the current motor car;
   a second calculation unit configured to, for each of the four axles of the current motor car, calculate, based on the axle load transfer at the four axles, a current axle load on the axle of the current motor car, wherein increased axle load transfer at the axle indicates a decreased axle load on the axle, and decreased axle load transfer at the axle indicates an increased axle load on the axle; and
   a distribution unit configured to adjust, based on current axle loads on the four axles, distribution of a tractive force applied to each of the four axles of the current motor car using an electrical control compensation technology, wherein the electrical control compensation technology comprises: for each of the four axles of the current motor car,
   if the axle load on the axle is decreased, decreasing an output torque of a traction motor arranged at the axle based on a decrease amount of the axle load, and
   if the axle load on the axle is increased, increasing an output torque of a traction motor arranged at the axle load based on an increase amount of the axle load.

5. The system according to claim 4, wherein the first calculation unit further comprises:
   a third calculation unit configured to calculate a force applied by a front coupler of the current motor car, a force applied by a rear coupler of the current motor car, and gravity of the current motor car based on the mass, the current acceleration, the current resistance and the current tractive force of the current motor car in a case where the target train is in a traction state; and
   a fourth calculation unit configured to calculate the axle load transfer at the four axles of the current motor car based on the force applied by the front coupler of the current motor car, the force applied by the rear coupler of the current motor car, the gravity of the current motor car, and the structural dimension of the current motor car in a case where the target train is in a traction state.

* * * * *